L. D. JORDAN.
FISHING REEL.
APPLICATION FILED DEC. 28, 1908.
916,712.  Patented Mar. 30, 1909.
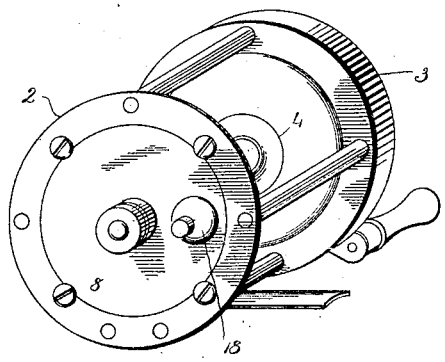
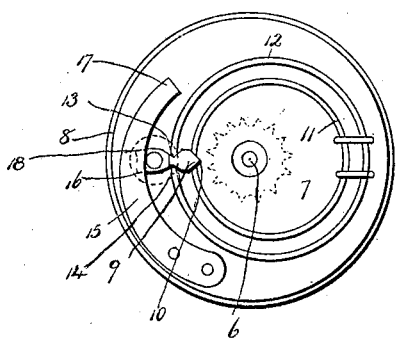
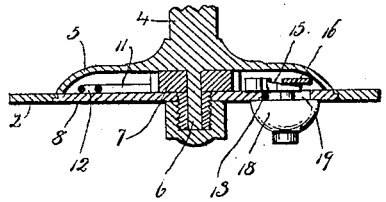
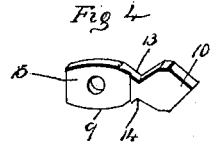
Witnesses
C. J. Reed
C. L. Reed
Louis D. Jordan
Inventor
by Seymour Earle
Attys

UNITED STATES PATENT OFFICE.

LOUIS D. JORDAN, OF NEW HAVEN, CONNECTICUT.

FISHING-REEL.

No. 916,712.     Specification of Letters Patent.     Patented March 30, 1909.

Application filed December 28, 1908. Serial No. 469,556.

*To all whom it may concern:*

Be it known that I, LOUIS D. JORDAN, a citizen of the United States, residing at New Haven, in the county of New Haven and State of Connecticut, have invented a new and useful Improvement in Fishing-Reels, and do hereby declare the following, when taken in connection with the accompanying drawings and the numerals of reference marked thereon, to be a full, clear, and exact description of the same, and which said drawings constitute part of this specification, and represent, in—

Figure 1 a perspective view of a fishing reel constructed in accordance with my invention. Fig. 2 an underside view of the disk showing the click wheel in broken lines. Fig. 3 a transverse sectional view. Fig. 4 a perspective view of the slide, detached.

This invention relates to an improvement in fishing reels, and particularly to such as are provided with the so called click, and so called drag on the line so that it will not run free. As usually arranged these two devices are thrown into or out of operation by separate buttons.

The object of this invention is to arrange and so construct the devices that they may be operated by a single button; and the invention consists in the construction hereinafter described and particularly recited in the claims.

The reel is of usual construction and comprises ends 2, 3, and spool 4. This spool has a cup-shaped end 5 and on the axle 6 of the spool is placed the usual toothed wheel 7. Secured to the end 2 and to cover the end of the spool is the usual disk 8. Secured to the inner face of this disk is a slide 9 comprising a pointed finger 10 which is adapted to be moved into the path of the toothed wheel 7 so that when the tooth revolves it will engage with the finger 10 which yields to the movement of the wheel, but drops from one tooth to another so as to produce a clicking sound. This point is held centrally by a ring-like spring 11 which is attached to the opposite side of the disk 8. Also attached to the disk 8 is a second ring like spring 12 the ends of which engage with notches 13 and 14 formed in opposite sides of the slide 9 to act as a catch as well as a guide.

The slide 9 has a rearwardly extending beveled end 15 which extends beneath a spring-arm 16 pivoted to the disk 8 and adapted to have its outer end 17 pressed against the end of the spool. This arm extends over the beveled end 15 of the slide and so that when the slide is moved outward it will pass beneath the arm and force the arm into contact with the spool, thus producing friction which will retard the movement of the spool, and hence provide a drag. This slide is connected with a button 18 through a slot 19 in the disk 8, and so that when the button is moved toward the center it will force the slide into engagement with the toothed wheel to produce the click; or if moved outward it will force the slide beneath the spring arm 17 to throw the drag into operation. At the intermediate point it is at rest and the spool may run free. It will thus be seen that the click and drag are both thrown into operation by a single button, thus materially simplifying the construction and operation of the reel.

I claim:—

1. A fishing reel comprising a frame, a spool mounted therein, the end of the spool provided with a toothed wheel, a disk adjacent to the end of the spool, a slide carried by said disk, said slide provided with a pointed finger, and a wedge-shaped end, a spring for holding the slide in position, a spring arm in the path of the wedge-shaped end of the slide, and a button arranged at the end of the reel and connected with said slide for moving the same, substantially as described.

2. A reel comprising a frame, a spool mounted therein, one end of the spool chambered and a toothed wheel mounted in said chamber, a disk secured to the frame and closing said chamber, a slide connected with said disk and having a pointed finger, tapered end and notched sides, a ring-like spring having its ends entered into said notches, a second ring-like spring having its end engaging opposite sides of the finger, a spring arm connected with said disk and extending over the tapered end of the slide, substantially as described.

In testimony whereof, I have signed this specification in the presence of two subscribing witnesses.

LOUIS D. JORDAN.

Witnesses:
    FREDERIC C. EARLE,
    CLARA L. WEED.